UNITED STATES PATENT OFFICE.

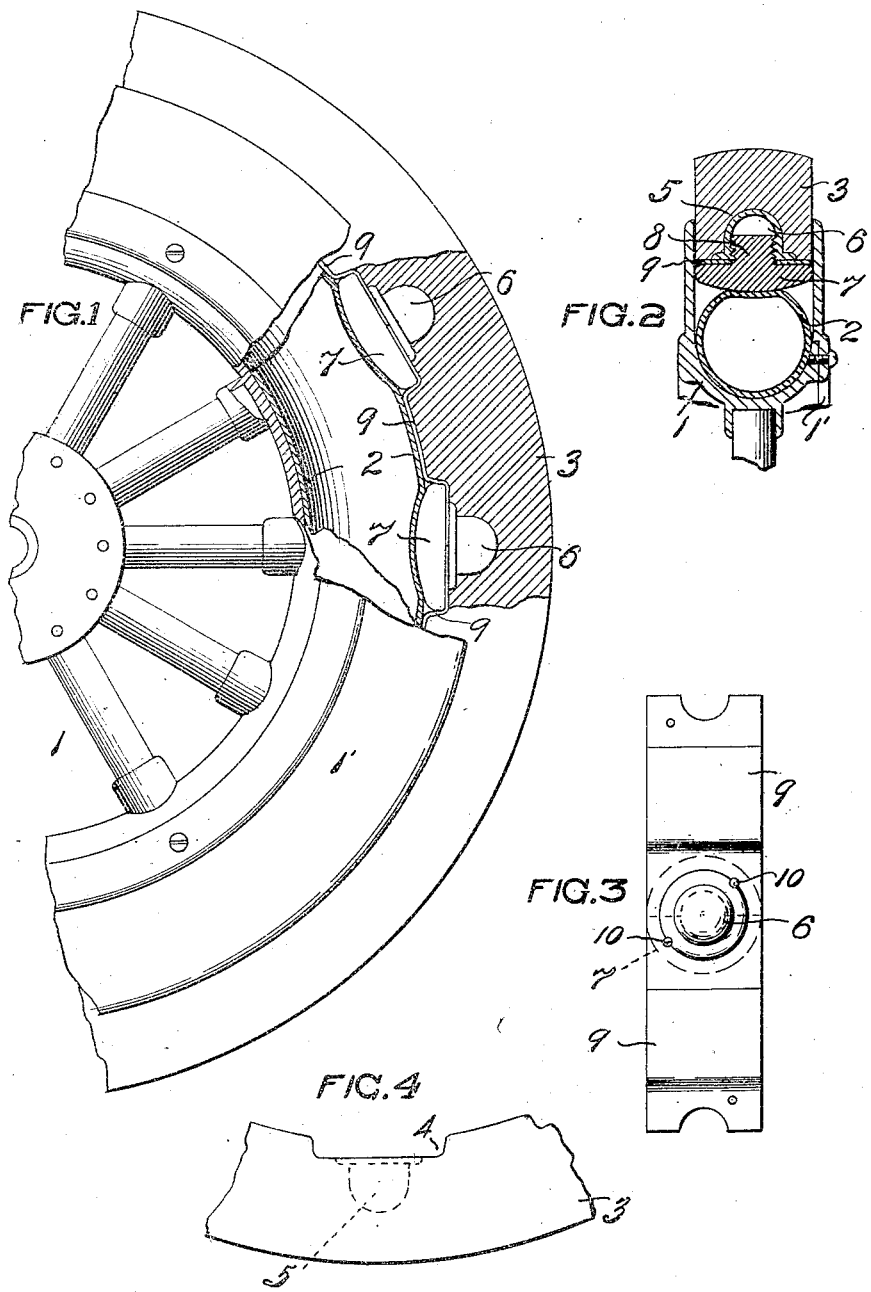

EDWIN D. WASSELL, OF WILKINSBURG, PENNSYLVANIA, ASSIGNOR OF SIX-TENTHS TO HARRY B. WASSELL, OF PITTSBURGH, PENNSYLVANIA.

AUTOMOBILE-TIRE.

1,186,460.  Specification of Letters Patent.  Patented June 6, 1916.

Application filed August 6, 1915. Serial No. 43,904.

*To all whom it may concern:*

Be it known that I, EDWIN D. WASSELL, a citizen of the United States, residing at Wilkinsburg, in the county of Allegheny and State of Pennsylvania, have invented a new and useful Improvement in Automobile-Tires, of which improvement the following is a specification.

My invention relates to improvements in that class of tires for the wheels of automobiles, trucks, etc., in which the tire proper is disposed about a pneumatic tube forming a cushion therefor.

My invention has for its object, to provide a tire of the above class, in which the pneumatic tube is protected from puncture; which will give the greatest possible resiliency in service, and that will be strong, durable and not liable to get out of order.

An embodiment of my invention is shown in the accompanying drawings, which form a part of this specification, it being understood that said drawings and description thereof is not for the purpose of defining the limits of my invention, the appended claims being referred to for that purpose.

In the several views of the drawings, like detail parts are designated by like numerals and referred to by such in the description to follow, said views being as follows:

Figure 1 is a side elevation of a portion of a wheel and tire embodying my invention, the same being shown as partly in section. Fig. 2 is a sectional elevation through the wheel rim and tire. Fig. 3 is a plan of a portion of the details thereof, and Fig. 4 is a side elevation of a portion of the tire.

The invention consists in providing a suitable wheel 1, having a rim of substantially U shape in cross-section, one side, 1', of the rim being detachable to permit the parts being readily inserted and repaired. Disposed within the wheel rim is the pneumatic tube 2, serving as a cushion for the tire.

The tire 3, which is formed of resilient material, preferably rubber, extends part way into the wheel rim, and has formed at spaced intervals, about its inner periphery, the depressions 4, said tire being also provided with flanged pockets 5 which are disposed centrally of the depressions.

Secured to the inner periphery of the tire, by means of the flanged caps 6, which fit snugly in the pockets 5, are the compressor heads 7, each of which has a shank 8 by which it is threadably secured to the cap. These compressor heads are rounded on their outer exposed surfaces, projecting slightly below the inner surface of the tire normally compressing the pneumatic tube, as shown.

The compressor heads are all connected to one another by the shouldered leaf spring members 9, virtually forming a ring. Each of these spring members is formed to correspond with and closely fit the inner surface of the tire normally engaging the pneumatic tube between the shouldered portions of the tire, the extreme ends of said members being forked. The forked meeting ends of these members are disposed about the shank of the compressor heads, between the flanged portion of the cap and head where they are firmly secured by the said cap, but may be further secured by rivets 10.

In practice, the compressor heads as they are successively brought into play at the tread, further compress the pneumatic tube in accordance to the pressure exerted thereon, the tire at that point being likewise compressed within the wheel rim, the spring members 9, particularly the portions thereof under compression with the head, also responding yieldingly. By this means or construction of tire, it will be readily apparent that the desired compression may be attained and at the same time protect the tube from puncture.

Should it, for any reason, be necessary to remove one or more of the spring members, or one or more of the compression heads, the tire with such parts may be readily removed for that purpose by the removal of the detachable side of the wheel rim.

Having thus shown and described my invention, what I claim and desire to secure by Letters Patent, is:

1. The combination with a wheel having a rim of somewhat U shape in cross-section, of a pneumatic tube disposed therein, a yieldable tire disposed about said tube, a plurality of spaced compression heads disposed between said tire and tube, and a plurality of leaf spring members disposed about and between the tire and tube connecting the compression heads to one another.

2. The combination with a wheel having a rim of somewhat U shape in cross-section, of a pneumatic tube disposed therein, a yieldable tire disposed about said tube the inner surface of which has spaced depressions formed therein, a plurality of spaced compression heads disposed between said tire and tube within said depressions, and a plurality of leaf spring members disposed about and between said tire and tube connecting said compression heads to one another.

3. The combination with a wheel having a rim of somewhat U shape in cross-section, of a pneumatic tube disposed therein, a yieldable tire disposed about said tube, the inner surface of which has spaced depressions formed therein and a pocket in each of said depressions, a compression head disposed in each of said depressions each of which is provided with a shank extending into the pocket of the tire, and leaf springs disposed between the tire and tube and connecting said heads one to the other.

4. The combination with a wheel having a rim of somewhat U shape in cross-section, of a pneumatic tube disposed therein, a yieldable tire disposed about said tube, the inner surface of which has spaced depressions formed therein and a pocket in each of said depressions, a compression head disposed in each of said depressions and provided with a screw cap, said cap being fitted in the tire pocket, and leaf springs disposed between the tire and tube the ends of which are secured to said heads by the caps thereof.

In testimony whereof, I have hereunto signed my name in the presence of two subscribing witnesses.

EDWIN D. WASSELL.

In the presence of—
R. S. HARRISON,
W. J. FAWCETT.